United States Patent [19]

Chatterjee et al.

[11] Patent Number: 5,798,308
[45] Date of Patent: Aug. 25, 1998

[54] CERAMIC ARTICLE

[75] Inventors: Dilip K. Chatterjee; Debasis Majumdar; Thomas N. Blanton, all of Rochester, N.Y.

[73] Assignee: Eastman Kodak Company, Rochester, N.Y.

[21] Appl. No.: 946,321

[22] Filed: Oct. 7, 1997

[51] Int. Cl.⁶ ............................................ C04B 35/488
[52] U.S. Cl. ....................... 501/103; 501/104; 501/106; 428/701; 428/702
[58] Field of Search ............................ 501/103, 104, 501/106; 428/697, 699, 701, 702

[56] References Cited

U.S. PATENT DOCUMENTS

| | | | |
|---|---|---|---|
| 5,290,332 | 3/1994 | Chatterjee et al. | 501/103 |
| 5,336,282 | 8/1994 | Ghosh et al. | 501/103 |
| 5,358,913 | 10/1994 | Chatterjee et al. | 501/103 |
| 5,674,794 | 10/1997 | Chatterjee et al. | 501/103 |
| 5,677,072 | 10/1997 | Chatterjee et al. | 428/701 |
| 5,683,481 | 11/1997 | Chatterjee et al. | 501/103 |

*Primary Examiner*—Karl Group
*Attorney, Agent, or Firm*—Carl F. Ruoff

[57] ABSTRACT

The present invention is a sintered ceramic article having an elemental composition including Zr, O, and at least one element selected from the group consisting of Mg, Ca, Y, Sc, Ce and rare earth elements. The ceramic article includes a core and a casing. The casing is exterior to and continuous with the core. The core is a mass of sintered particles having an essentially tetragonal zirconia crystalline structure and the casing is a mass of sintered particles having a mixture of monoclinic zirconia crystalline structure and zircon crystalline structure.

4 Claims, 3 Drawing Sheets

CERAMIC ARTICLE

CROSS REFERENCE TO RELATED APPLICATIONS

This application relates to commonly assigned application Ser. No. 08/946,046, now U.S. Pat. No. 5,804,131 Express Mail No. EM03 1050130 US filed simultaneously herewith and hereby incorporated by reference for all that it discloses.

FIELD OF THE INVENTION

The present invention pertains to functionally gradient ceramic items and methods for preparing such ceramic items and more particularly pertains to ceramic articles, tools, and methods for preparing ceramic articles and for sintering.

BACKGROUND OF THE INVENTION

Zirconia ($ZrO_2$) is a ceramic material which, in its tetragonal crystal structure, is strong and tough but has the shortcoming that it is relatively soft. This means that zirconia in the tetragonal crystal structure is not as hard as zirconia in other crystal structures. Zirconia can also exist in the cubic and monoclinic crystallographic structures, both of which are harder but more brittle than the tetragonal structure. Fully stabilized metastable tetragonal zirconia can be obtained by appropriate alloying of pure zirconia with selected dopants. Cubic and monoclinic phases of zirconia require thermal, thermo-mechanical or some alloying treatments for its formation. For tools and more particularly for cutting tool applications it is desired that the tool materials possess hardness at the work surfaces and toughness at the core of the articles.

It is an object of the invention to provide improved ceramic articles and tools, and improved methods for preparing ceramic articles and sintering in which a hard case containing essentially monoclinic zirconia and zircon is provided over a tough core containing essentially tetragonal zirconia. In the broader aspects of the method for preparing ceramic articles of the invention, there is provided a method for preparing a ceramic article comprising compacting a particulate including a primary oxide and a secondary oxide to form a green blank. The primary oxide is $ZrO_2$. The secondary oxide is selected from the group consisting of MgO, CaO, $Y_2O_3$, $Sc_2O_3$, rare earth oxides and combinations thereof. The green blank is coated by any convenient means, such as spin coating, dip coating, etc. by a sol containing a smectite clay, specifically a hydrous magnesium lithium silicate or fluorosilicate with a layered structure, and subsequently sintered. The sintered zirconia alloy ceramic article thus produced has a case containing essentially monoclininc zirconia phase and zircon (zirconia silicate-chemical formula $ZrSiO_4$) and a core containing tetragonal zirconia phase. The case, because of the nature of the phases, is extremely hard and the core is tough. Moreover, there is a gradient of phases existing in the article.

SUMMARY OF THE INVENTION

The present invention is a sintered ceramic article having an elemental composition including Zr, O, and at least one element selected from the group consisting of Mg, Ca, Y, Sc, Ce and rare earth elements. The ceramic article includes a core and a casing. The casing is exterior to and continuous with the core. The core is a mass of sintered particles having an essentially tetragonal zirconia crystalline structure and the casing is a mass of sintered particles having a mixture of monoclinic zirconia crystalline structure and zircon crystalline structure.

For a better understanding of the present invention, together with other advantages and capabilities thereof, reference is made to the following detailed description in connection with the above-described drawings.

DETAILED DESCRIPTION OF THE PRESENT INVENTION

In the present invention, particulate zirconia alloy is compacted and the "green" article is coated with a sol containing a synthetic smectite clay which is subsequently sintered. The resulting ceramic article of the invention has a case containing essentially monoclinic zirconia ($ZrO_2$)and zircon ($ZrSiO_4$) and a core containing essentially tetragonal zirconia ($ZrO_2$). The transition from the case to the core of the articles is gradual, particularly in terms of the crystal structures of the transition layers, making it a functionally gradient structure. Depending on the function of the cutting tool and work surfaces, a hard outer surface is needed; however if the core is not tough the article will break. Further, if the transition from core to surface is not gradual the tool can crack and spall.

Figure 1:
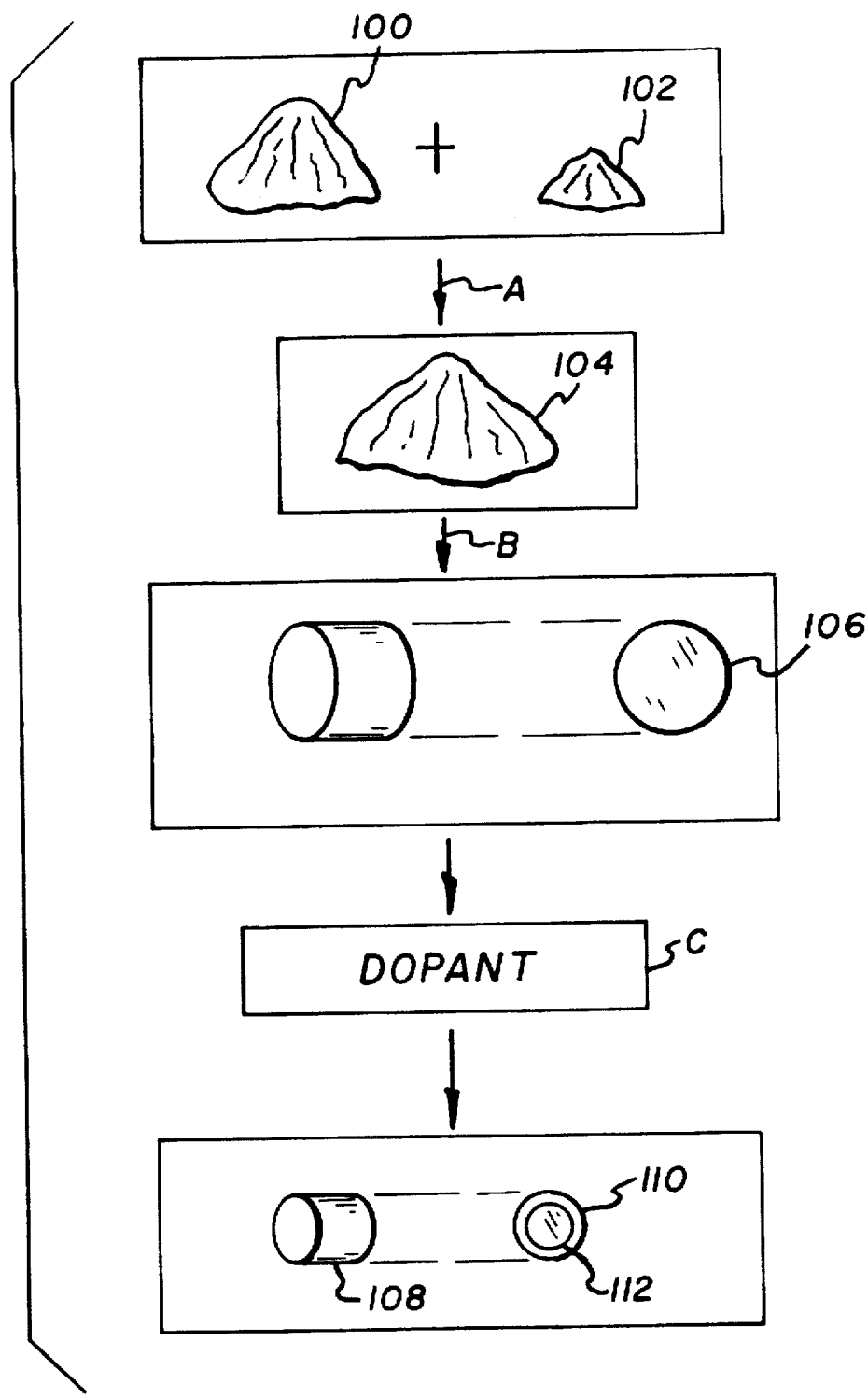
FIG. 1 is a schematic diagram of the method of the invention.

The methods of the invention utilize particulate alloys of $ZrO_2$ and additional oxide selected from: MgO, CaO, $Y_2O_3$, $Sc_2O_3$ and $CeO_2$ and other rare earth oxides (also referred to herein as "Mg-Ca-Y-Sc-Ce-rare earth oxides"). Zirconia alloys useful in the methods of the invention have a fully stabilized tetragonal crystal structure in the temperature and pressure ranges at which the ceramic article produced will be used. For example, at temperatures up to about 200° C. and pressures up to about 1000 MPa, zirconia alloys having about 2 to about 20 mole percent Mg-Ca-Y-Sc-Ce-rare earth oxide exhibit a tetragonal structure. Preferred oxides for alloying with zirconia are $Y_2O_3$, MgO, CaO, $CeO_2$ and combinations of these oxides. It is preferred that the zirconia alloys have from 2 to 5 mole percent of the Mg-Ca-Y-Sc-Ce-rare earth oxides. Step "A" in FIG. 1, illustrates the alloying process. Zirconia powder 100 is combined with one or more secondary oxide powders 102 to provide zirconia alloy powder 104. It is preferred that the zirconia powder has a high purity, greater than about 99.9 percent. The preparation of zirconia alloys is well known to those skilled in the art and zirconia alloys are available commercially. For example, particulate zirconia alloy having 3 mole percent $Y_2O_3$ is marketed by several vendors such as HANWHA Advanced Ceramics, PTY Ltd. (as HWA-ZY 3P), Zirconia Sales Corporation of America (as HSY-3SD), and TOSHO Corporation (as 3YB).

The grain and agglomerate sizes and distributions, moisture content and use of binder in the zirconia alloy are selected in a manner well known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. An example of useful grain and agglomeration sizes and distributions for a particular embodiment of the invention is the following. The grain size is from about 0.1 micrometers to about 0.6 micrometers. The average grain size is 0.3 micrometers. The distribution of grain size is: 5–15 percent less than 0.1 micrometers, 40–60 percent less than 0.3 micrometers, and 85–95 percent less than 0.6 micrometers. The surface area of each individual grain ranges from about 10 to about 15 m$^2$/g or is preferably 14 m$^2$/g. Agglomerate size is from about 30 to about 60 micrometers and average agglomerate size is 40–60 micrometers. Moisture content of the powder is about 0.2 to 1.0 percent by volume of blank and is preferably 0.5 percent. The alloy powder is compacted in the presence of a binder such as gelatin or polyvinyl ionomer or more preferably polyvinyl alcohol. The binder is added to and mixed with the powder, for example by spraying or ball milling prior to placement of the powder in a compacting device.

Specific examples of alloys useful in the methods of the invention include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. Pat. No. 5,336,282, which is hereby incorporated herein by reference. In the above U.S. patent, the alloy is selected so as to provide a "net shape" ceramic article as that term is defined therein: a ceramic article that is dimensionally true after sintering and therefore does not necessitate further machining prior to use in its intended working environment. In other words, the amount of shrinkage during sintering is predictable, producing a ceramic part that conforms to a predetermined shape and dimensions. The particulate zirconia alloy is substantially uniform. Purity of the alloy is well controlled at 99.9 to 99.99 percent, that is, impurities are no more than about 0.1 to 0.01 percent. Grain size is from about 0.1 micrometers to about 0.6 micrometers. Average grain size is 0.3 micrometers. The distribution of grain size is: 10 percent less than 0.1 micrometers, 50 percent less than 0.3 micrometers, and 90 percent less than 0.6 micrometers. Surface area of each individual grain ranges from about 10 to about 15 m$^2$/g and is preferably 14 m$^2$/g. Agglomerate size is from about 30 to about 60 micrometers. Average agglomerate size is 50 micrometers. Moisture content of the powder is about 0.2 to 1.0 percent by volume of blank and is preferably 0.5 percent.

The particulate zirconia alloy powder 104 is compacted in a die, using a press to form a "green" blank 106. The "green" blanks can be formed by several methods known in the art including cold or dry pressing, and injection molding.

In addition to being compacted, the zirconia alloy powder 104 is heated to a temperature range at which sintering will occur. Sintering is a process where an article is maintained at within a temperature range for a period of time; and then cooled. During all or part of sintering, the zirconia alloy powder "green" compact, 106 is in contact with dopant, as discussed below in detail. Compaction and sintering are generally discussed herein as two consecutive operations, as indicated by "B" and "C" in FIG. 1; however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 106 in FIG. 1. Blank 106 is at least partially compacted and is either unsintered or not fully sintered. Completion of compacting and sintering provides the finished ceramic article 108, which has a substantially monoclinic zirconia and zircon phase case 110 and a substantially tetragonal phase zirconia core 112. These types of articles are defined as functionally gradient ceramic articles.

The particular method of compacting the zirconia alloy powder 104 is not critical. In a preferred embodiment of the invention, the particulate zirconia alloy is cold compacted to provide an unsintered blank, which is also referred to herein as a "green" preform. The terms "cold compaction" refers to compression of the particulate alloy at a temperature below glass transition or decomposition temperature of the binder. The green preform can be produced by such methods as cold uniaxial pressing, cold isostatic pressing, injection molding or cold extrusion. The alloy powder is preferably subjected to uniform compacting forces in order to provide a blank 106 which has a uniform density.

Figure 2:
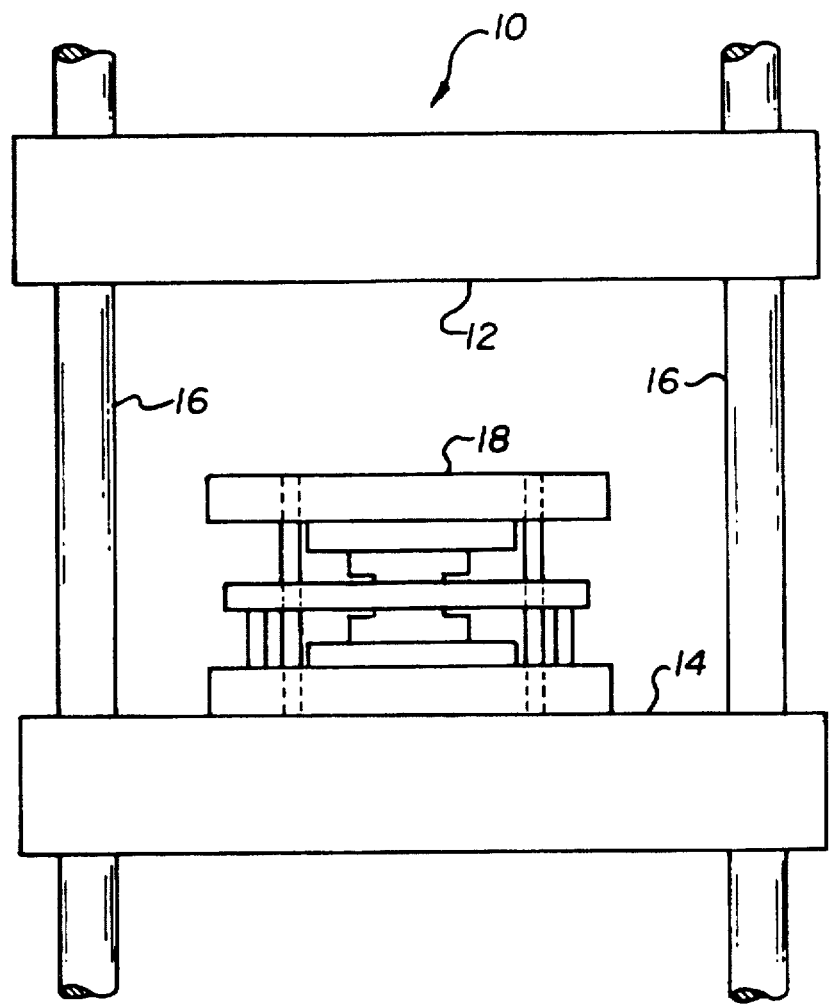
FIG. 2 is a fragmentary, cross-sectional view of a die press useful in the method of the invention.
Figure 3:
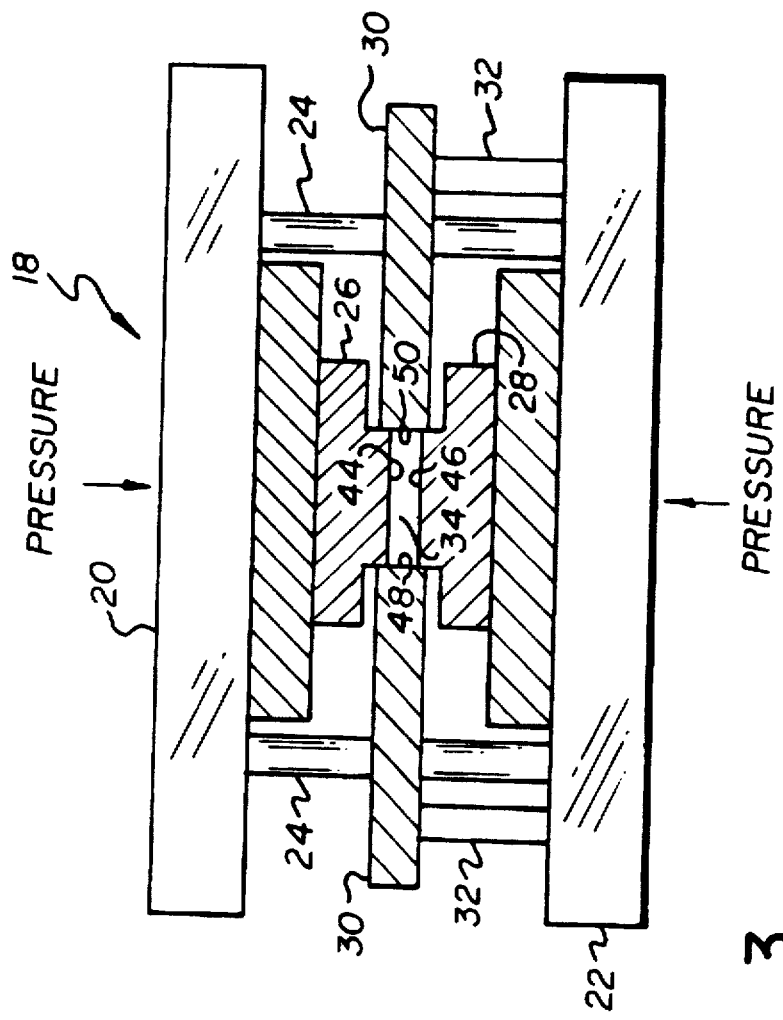
FIG. 3 is an enlarged cross-sectional view of the mold and die assembly of the die press.

A preferred compacting device that achieves uniform compacting forces is a floating mold die press 10, as disclosed in U.S. Pat. No. 5,336,282 and as shown in FIG. 2. Die press comprises fixed platform 12 and movable platform 14 mounted on supports 16. Movable platform 14 is driven by hydraulic means (not illustrated) and supports mold and die assembly 18. FIG. 3 further illustrates assembly 18 as comprising plates 20, 22, which are slideably mounted on rods 24. Die sets 26, 28 are mounted respectively on plates 20, 22. Center platen 30 is mounted by spacer plates 32 on plate 22, and together with die sets 26, 28 defines cavity 34 there between. The zirconia alloy powder 104 premixed with binder is compacted by first placing in cavity 34. Platform 14 is then moved in the direction illustrated by the direction arrows in FIG. 3 so that plate 20 contacts platform 12 (FIG. 2) with a hydraulic pressure in the above described range, forcing plate 22 toward plate 20 and thereby compacting the powder to form the blank or green preform. The compaction forces exerted on the powder are substantially uniform because plates 20, 22 are each free to move on rods 24, resulting in a blank having a uniform density.

Mold and die assembly 18 should have dimensionally close tolerances in order to minimize or eliminate the need for post-sintered machining of working surfaces of the finished ceramic article. For example, compaction surfaces 44, 46 of respective die sets 26, 28 can be parallel with a maximum design deviation from parallel of plus or minus 0.00005 inches. Compaction surfaces 48, 50 of center platen 30 can be perpendicular to surfaces 44,46 and have a maximum design deviation from perpendicularity of plus or minus 0.00005 inches. The fill ratio should be established to produce a blank of a desired dimension, which after sintering will result in a ceramic of the final desired dimension. "Fill ratio" is the ratio of the height of cavity 34 taken along the axis of movement of platform 14 with platform 14 in its initial, lowermost position, to the height of the green part formed in cavity 34 taken along the axis of compaction of the powder in cavity 34. In other words, such height of the green preform also equals the distance between compaction surfaces 44,46 of mold and die assembly 18 at the final end-of-compacting position.

In a preferred method of the invention, the alloy powder is cold compacted to a "green" density which is substantially less than the final sintered density of the tetragonal structure zirconia, that is, the density of the green preform 106 is substantially less than the density of a functionally gradient ceramic article 108 produced from that green preform 106 after sintering. The final sintered density of a completely tetragonal structure ceramic article differs slightly from the final sintered density of a ceramic article 108 of the invention in that articles 108 produced by the methods of the invention have a substantially monoclinic zirconia and zircon structure case 110 and a substantially tetragonal zirconia structure core 112. Except for very small articles 108, this difference can be ignored and final sintered density can be considered the density of the article 108 produced by the methods of the invention after sintering. It is preferred that the green density be between about 40 and about 65 percent of the final density of the tetragonal structure zirconia, or more preferably be about 60 percent of the final density of the tetragonal structure zirconia. In an example from a particular embodiment of the invention, an article 108 produced from a zirconia alloy having 3 mole percent $Y_2O_3$ has a final sintered density of 6.08 $g/cm^3$, a range of preferred green densities of from about 2.5 to about 4.0 $g/cm^3$, and a more preferred green density of about 3.65 $g/cm^3$.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 psi (100 MPa), the compaction time can be 30 seconds. It is well known that the compaction pressure and time selected by the operator can be dependent upon the size of the finished part 108. Generally, as the part size increases, compaction time is increased.

The sol used in coating the "green" part contains a commercially available synthetic smectite clay which closely resembles the natural clay mineral hectorite in structure and composition. Hectorite is a natural swelling clay which is relatively rare and occurs contaminated with other minerals such as quartz which are difficult and expensive to remove. Synthetic smectite is free from natural impurities, and is prepared under controlled conditions. One such synthetic smectite clay is commercially marketed under the tradename Laponite by Laporte Industries, Ltd. of United Kingdom through its US subsidiary Southern Clay Products, Inc., Texas. The specific smectite clay used in this invention is a layered hydrous magnesium lithium silicate or fluorosilicate, such as Laponite S supplied by Southern Clay Products, Inc., with a typical chemical composition as shown below:

SiO 50–52 wt. %
MgO 22–24 wt. %
$Li_2O$ 1.1–1.4 wt. %
$Na_2O$ 6.0–8.0 wt. %
$P_2O_5$ 3.3–5.5 wt. %
F 4.7–5.2 wt. %
Loss on ignition 8.5–9.0 wt. %

Some of the Laponite products contain a polyphosphate peptizing agent such as tetrasodium pyrophosphate for rapid dispersion capability; alternatively, a suitable peptizer can be incorporated into Laponite subsequently for the same purpose.

Having a clay type structure, Laponite separates into tiny platelets of lateral dimension of 25–50 nm and a thickness of 1–5 nm in deionized aqueous dispersion, commonly referred to as sols. Typical concentration of Laponite in a sol can vary from 0.1% to 30%, but preferably 20%. During dispersion in deionized water an electrically double layer forms around the clay platelets resulting in repulsion between them and no structure build-up. However, in the presence of electrolytes, the double layer can be reduced resulting in attraction between the platelets forming a "house of card" structure with significant increase in viscosity. One can carefully control the viscosity of the sol by adjusting the level of electrolyte in the sol. This advantage of distinctive Theological property is utilized in the present invention in varying the thickness of the hard case.

The coating of the sol, containing the synthetic smectite clay described above, on the "green" zirconia ceramic article 106 can be accomplished by any of the conventional techniques, such as spin coating, dip coating, spray coating, etc. Upon coating, the sol containing the synthetic smectite clay will penetrate a certain depth from the surface of application into the "green" zirconia ceramic article 106, because of the inherent porosity of the "green" article. This depth of penetration, after sintering, will determine the thickness of the case of the ceramic article 108. Since the depth of penetration of the sol containing the synthetic smectite clay in the "green" ceramic article 106 is dependent on the viscosity of the sol, one can easily control this by adjusting the level of electrolyte in the sol or other suitable means. Thus, as per this invention, one will be able to easily tailor the thickness of the ceramic casing by controlling the viscosity of the sol. This provides significant advantage over the teachings of U.S. Pat. No. 5,385,913 herein incorporated by reference, where the thickness of a similar hard "case" is fixed by the solid phase thermal diffusion properties of the oxides and cannot be controlled.

It is preferred that the sintering results in a ceramic article 108 having a "full" or nearly theoretical density, and it is more preferred that the density of the ceramic article 108 be from about 99.5 to about 99.9 percent of theoretical density. In an example from a particular embodiment of the invention, an article produced from a zirconia alloy having 3 mole percent $Y_2O_3$ has a final sintered density of 6.05–6.08 $g/cm^3$ with a grain size of less than 1 micrometer and preferably less than 0.5 micrometers.

Sintering is conducted in air or other oxygen containing atmosphere. The methods of the invention are not limited to any particular sintering pressure and temperature conditions. Sintering can be performed at atmospheric pressure or alternatively a higher pressure can be used during all or part of the sintering to reduce porosity. The sintering is continued for a sufficient time period for the case of the article being sintered to reach a thermodynamic equilibrium composition and structure. The core which is free from the synthetic smectite clay continues to have a tetragonal equilibrium structure. An example of a useful range of elevated sintering pressures is from about 69 MPa to about 207 MPa, or more preferably about 100–103 MPa. An example of a useful range of sintering temperatures is from about 1300° C. to about 1600° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours.

It is preferred that the sintered blank be slowly heated to sintering temperature and slowly cooled so as to avoid undesirable dimensional changes and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute from about 1500° C. to about 800° C. and about 1.6° C./minute from about 800° C. to room temperature.

Figure 4:
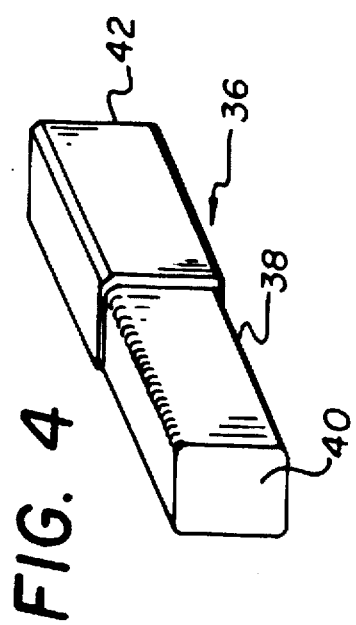
FIG. 4 is an enlarged schematic view of a ceramic perforator punch according to the invention.

The methods of the invention are applicable to the production of a variety of articles, particularly cutting tools and abrasion and wear resistant parts, in that many tools have a longer service life if the working surface is a hard cast overlying a tough core. Examples of tools include slitter knives, punches and dies for cloth, cardboard, metal, polymeric materials and paper coated with abrasive materials such as silver halides, magnetic particles and the like. FIG. 4 illustrates a ceramic perforator 38 having cutting edge 40 mounted on mounting shank 42. Perforator can be mounted by shank 42 on any typical punch assembly, such as a reciprocating punch or a rotary punch upon which can be mounted a plurality of punches 36. The case of perforator 38 can be limited to cutting edge 40 or can encompass the entire outside of perforator. Typical hardnesses for monoclinic zirconia casts with zirconia silicate of articles prepared by the methods of the invention are 15–17 GPa. This contrasts with hardnesses of 12–13 GPa typical of tetragonal zirconia. The configuration of articles prepared by the methods of the invention is limited by the requirements of cold compaction and sintering; for example, mold size and shape and sintering oven size and shape; but is not believed to be subject to other limitations. The methods and articles of the invention are not limited to discrete ceramic items, thus the terms blank and ceramic article and the like, used herein can also refer to portions of larger items.

The following working Examples and comparative Examples are presented for a further understanding of the invention: It is understood that there are other variations and modifications which can be effected by a person of ordinary skill in the art without departing from the scope of the invention.

The results of the working Examples and comparative Examples were evaluated by detecting the crystalline phases present in the case, interface regions and in the core of the sintered articles.

Zirconia alloy having 3 mole percent $Y_2O_3$ was obtained as a prepared alloy powder, HWA-ZY3P from HANWHA Advanced Ceramics, PTY Ltd. The alloy powder had an agglomerate size ranging from 30 micrometers to 60 micrometers, an average agglomerate size of 50 micrometers, a grain size ranging from 0.1 micrometer to 0.6 micrometer, an average grain size of 0.3 micrometers, and a moisture content of 0.5 percent by volume. Polyvinyl alcohol in the amount of 4 percent by volume of the green part was added to the ceramic powder as a binder and mixed thoroughly by ball milling. The powder was compacted in the floating mold die press above described, at a compacting pressure of 15,000 psi (100 MPa) for 30 seconds and with a fill ratio of about 3 to 1, to compact the powder into a blank. The blank was placed on a zirconia plate during sintering and was sintered by sequentially heating the green part from room temperature to 300° C. at a rate of 0.3° C./min., from 300° C. to 400° C. at a rate of 0.1° C./min., from 400° C. to 600° C. at a rate of 0.4° C./min, from 600° C. to 1500° C. at a rate of 1.5° C./ min.; then maintaining the preform at 1500° C. for 120 minutes; and then sequentially cooling the part from 1500° C. to 800° C. at a rate of 2° C./minute, from 800° C. to room temperature at a rate of 1.6° C./minute. Dimensional shrinkage was uniform throughout the ceramic article to within 0.001 percent.

A number of "green" blanks similar to the above were prepared following the procedures described above. These blanks were spin coated with one sol from a group of Laponite RDS 10%, Laponite S 10%, Laponite JS 15%, Montmorillonite SC PX 2.37% (all supplied by Southern Clay Products), Ludox 10%, Ludox 30% (all supplied by Dupont). Spin coating of the above sols on "green" ceramic blanks was performed at 600–2000 rpm for 0.25 to 1 minute. The viscosities of the clay sols was altered by the addition of different levels of electrolyte in the sols. The differing viscosities of the sols allowed differing penetration of the sols in the porous "green" ceramic blanks.

The spin coated "green" ceramic blanks were then dried in an oven at about 75° to 150° C. for about 0.5 to 1 hour before placing on a zirconia plate and sintered per schedule described above.

X-ray diffraction analysis was performed using a Model RU300 X-ray diffractometer manufactured by Rigaku Corp. of Japan. Coupled angle diffraction was used to detect the phases present at the core. Glancing angle diffraction was used to detect the phases at the case.

Results are presented in Table 1.

TABLE 1

| Working Example/ Comparative Example | Treatment | Case Crystalline Phase (rel. amount) | Interface Crystalline Phase | Core Crystalline Phase |
|---|---|---|---|---|
| 2 | RDS 10% | Monoclinic $ZrO_2$ (major 85-90%) $ZrSiO_4$ (minor 5–10%) Tetragonal $ZrO_2$ (minor ≦5%) | Tetragonal ZrO2 (major) Monoclinic $ZrO_2$(minor) $ZrSiO_4$ (possible trace) $SiO_2$(trace) | Tetragonal $ZrO2$(major) Monoclinic $ZrO2$(trace) |
| 3 | S 10% | Monoclinic $ZrO_2$ (major 75–85%) $ZrSiO_4$ (moderate 10–20%) Tetragonal $ZrO_2$ (minor ≦5%) | Tetragonal $ZrO2$(major) Monoclinic $ZrO_2$(minor) | Tetragonal $ZrO2$(major) Monoclinic $ZrO_2$(trace) |
| 4 | JS 15% | Tetragonal $ZrO_2$(major) Monoclinic $ZrO_2$(minor) | Tetragonal $ZrO_2$(major) Monoclinic $ZrO_2$(trace) | Tetragonal $ZrO_2$(major) Monoclinic $ZrO_2$(trace) |

TABLE 1-continued

| Working Example/ Comparative Example | Treatment | Case Crystalline Phase (rel. amount) | Interface Crystalline Phase | Core Crystalline Phase |
|---|---|---|---|---|
| 5 | SCPX 2.37% | Tetragonal $ZrO_2$(major) Monoclinic $ZrO_2$(major) [includes some contribution from interface region] | Tetragonal $ZrO_2$(major) Monoclinic $ZrO_2$(trace) | Tetragonal $ZrO_2$(major) Monoclinic $ZrO_2$(trace) |
| 6 | Ludox 10% | | Tetragonal $ZrO_2$(major) Monoclinic $ZrO_2$(trace) | Tetragonal $ZrO_2$(major) Monoclinic $ZrO_2$(trace) |
| 7 | Ludox 30% | | Tetragonal $ZrO_2$(major) Monoclinic $ZrO_2$(trace) $ZrSiO_4$(trace) $SiO_2$(trace) | Tetragonal $ZrO_2$(major) Monoclinic $ZrO_2$(trace) |
| 1 | "Green" ceramic blank sintered on a zirconia plate | Tetragonal $ZrO_2$(major) Monoclinic $ZrO_2$ (trace) | Tetragonal $ZrO_2$ (major) Monoclinic $ZrO_2$(trace) | Tetragonal $ZrO_2$(major) Monoclinic $ZrO_2$(trace) |

2 and 3 are Working Examples and 1, 4, 5, 6 and 7 are Comparative Examples 2 and 3 are Working Examples and 1, 4, 5, 6 and 7 are Comparative Examples.

From the results described in Table 1 for the above described Working and Comparative Examples, the Working Examples 2 and 3 show that for the sintered ceramic articles: case crystalline structure consists essentially of monoclinic $ZrO_2$ and zircon ($ZrSiO_4$); interface crystalline structure consists essentially of tetragonal $ZrO_2$ and minor to trace amount of zircon ($ZrSiO_4$); and the core crystalline structure consists essentially of tetragonal $ZrO_2$ with trace amounts of monoclinic $ZrO_2$.

The Comparative Examples 1, 4, 5, 6 and 7 indicate that the case, interface and core crystalline structures of the sintered ceramic articles are essentially tetragonal $ZrO_2$ with trace amount of monoclinic $ZrO_2$. Zirconia alloy and its composites are known to have excellent corrosion resistance. Monoclinic $ZrO_2$ is substantially harder than tetragonal $ZrO_2$. Zircon ($ZrSiO_4$) provides better wear and abrasion resistance than tetragonal zirconia. Monoclinic $ZrO_2$ is also known to have much superior wear and abrasion resistance. On the other hand tetragonal $ZrO_2$ possesses high fracture toughness. Having a hard working surface or case for a ceramic article (such as cutting tool etc.) with an underlaying tough core is ideal for many applications such as slitting, perforating, cutting of paper or polymeric web with or without coatings of photographic emulsion, magnetic particles, etc.

The invention has been described in detail with particular reference to certain preferred embodiments thereof, but it will be understood that variations and modifications can be effected within the spirit and scope of the invention.

What is claimed is:

1. A sintered ceramic article having an elemental composition including Zr, O, and at least one element selected from the group consisting of Mg, Ca, Y, Sc, Ce and rare earth elements, said ceramic article including a core and a casing, said casing being exterior to and continuous with said core, said core comprising a mass of sintered particles having a essentially tetragonal zirconia crystalline structure and, said casing comprising a mass of sintered particles having a mixture of monoclinic zirconia crystalline structure and zircon crystalline structure.

2. The sintered ceramic article of claim 1 wherein said particles of said core and said casing have a grain size from about 0.1 to about 0.6 micrometers and an having agglomerate size from about 30 to about 60 micrometers before sintering.

3. The sintered ceramic article of claim 1 wherein said ceramic article has a density of from 6.05 to 6.08 g/cm³.

4. The sintered ceramic article of claim 1 wherein said casing comprises from about 75 to about 90% monoclinic zirconia crystalline structure and from about 5 to about 20% zircon crystalline structure.

* * * * *